Nov. 5, 1968 K. E. SHILL 3,409,107

COUPLING WITH DEFORMABLE MEMBER

Filed Aug. 15, 1966 2 Sheets-Sheet 1

KARL E. SHILL
INVENTOR.

BY Ronald P. Shipman
AGENT

United States Patent Office 3,409,107
Patented Nov. 5, 1968

3,409,107
COUPLING WITH DEFORMABLE MEMBER

Karl E. Shill, Fremont, Calif., assignor to Friden, Inc., a corporation of Delaware Filed Aug. 15, 1966, Ser. No. 572,248
10 Claims. (Cl. 192—17)

ABSTRACT OF THE DISCLOSURE

A perforated paper tape capstan drive and/or braking system wherein a hollow capstan has inserted within the bore of the capstan an axially and radially deformable member for selective releasable engagement with the surface of the capstan's bore. The deformable member may be either stationary or constantly rotating, thereby providing a brake or rotative coupling, respectively.

The present invention pertains to a mechanism for selective coupling of two relatively rotatable members and, in particular, relates to a clutch mechanism for selectively rotating and braking a drive capstan in a high-speed paper tape reader.

Perforated paper tape handling apparatuses generally include a driving member or capstan for firm engagement of the paper web, and which is selectively rotated to transport the paper tape through the apparatus. Successful paper tape handling apparatuses should include the ability to transport the paper tape through the device at a relatively high speed in order that data to be recorded on or transcribed from the paper tape may be handled as rapidly as possible and with a minimum of non-data transmitting times involved.

In a successful paper tape handling apparatus it is highly desirable that the movement of the paper tape may be halted and reversed in the device in order that writing (punching of holes) corrections may be made to the tape, or the reading (hole sensing) of data from the tape may be repeated, or for searching of information on the tape either forward or backward. In the past, reversing of paper tape through a tape handling device is generally accomplished by stopping the capstan and manually operating the drive capstan in order to reverse the tape to a desired previously read position. It is, therefore, highly desirable that the paper tape handling apparatus include, within itself, means for rapidly reversing the direction of movement of the tape as and when required.

It is, therefore, a principal object of the present invention to provide an improved paper tape handling apparatus.

Briefly stated, the objects of the present invention are accomplished in a paper tape handling device by providing a hollow relatively lightweight capstan and an improved coupling mounted within the capstan. The coupling basically comprises a continuously rotated flexible or deformable member which is frictionally engageable with the inside surface of the capstan when the deformable member is compressed between the surfaces of two movable parts.

The features of novelty that are considered characteristic of this invention are set forth with particularity in the appended claims. The organization and method of operation of the invention may best be understood from the following description when read in connection with the accompanying drawings in which:

Similar numerals refer to similar elements throughout the drawing.

Figure 1:
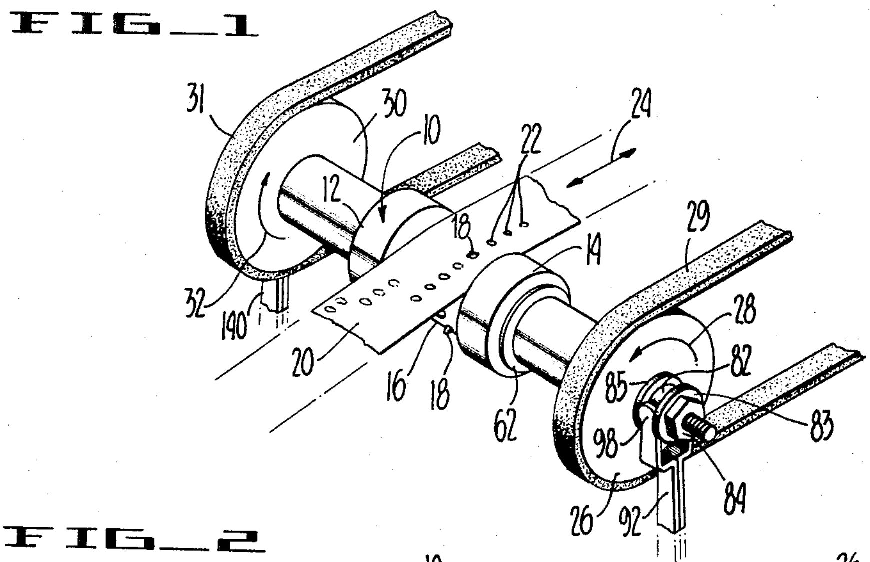
FIG. 1 is a perspective view of one embodiment of the present invention illustrating the drive mechanism.

In FIG. 1 there is shown a paper tape drive means or member 10, also termed a "capstan" which is provided with axially opposite mounting portions or shoulders 12 and 14 between which is formed a cylindrically shaped paper tape-engaging surface 16. A plurality of circumferentially spaced tape-engaging sprockets 18 protrude radially outwardly from the cylindrical surface 16. A portion 20 of a relatively long web of paper tape is trained over and in contact with a portion of the cylindrical surface 16. The paper tape is formed with a longitudinal column of sprocket-engaging perforations 22. When the capstan 10 is rotated in either direction about its longitudinal axis by mechanisms to be described, the sprockets 18 engage and protrude through the perforations 22, thereby positively driving the paper tape in a path indicated by double-headed arrow 24. A drive pulley 26 is rotated at a constant angular velocity, as indicated by direction arrow 28, by means of a belt 29 which may be interconnected with a suitable source of constantly energized motive power such as, for example, an electric motor (not shown). Another drive pulley 30 is rotated at a constant angular velocity, opposite in direction to drive pulley 26, as indicated by direction arrow 32; pulley 30 may be driven by means of a belt 31 and motive power source (not shown) in the same manner as described for pulley 26. Selective application or coupling of rotative power from either of the pulleys 26 or 30 to the capstan 10 is accomplished as hereinafter described.

Figure 2:
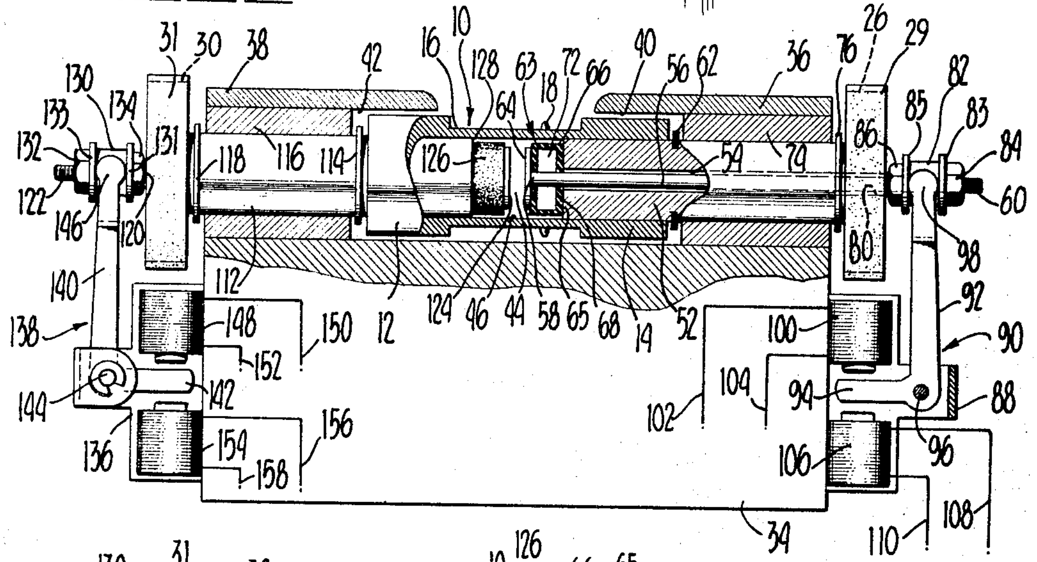
FIG. 2 is a partial cross-sectional end view of the FIG. 1 embodiment of the present invention.

In FIG. 2 there is shown a stable base or frame 34 having a pair of upstanding spaced apart side portions 36 and 38, each of which is formed with a cylindrical bore 40 and 42, respectively, having substantially identical internal diameters which are somewhat greater than the external diameter of the shoulder portions 12 and 14 of the capstan 10. The side portion bores are axially in line with each other. The capstan 10 is inserted axially through either of the bores 40 or 42 and disposed so that the capstan's left shoulder portion 12 is contained substantially within the inner or right-hand end of bore 42, while the capstan's right shoulder portion 14 is contained substantially within the inner or left-hand end of bore 40. Thus, the cylindrical surface 16 of the capstan 10 bridges or is substantially centered axially across the space between the frame's spaced side portions 36 and 38.

Figure 3:
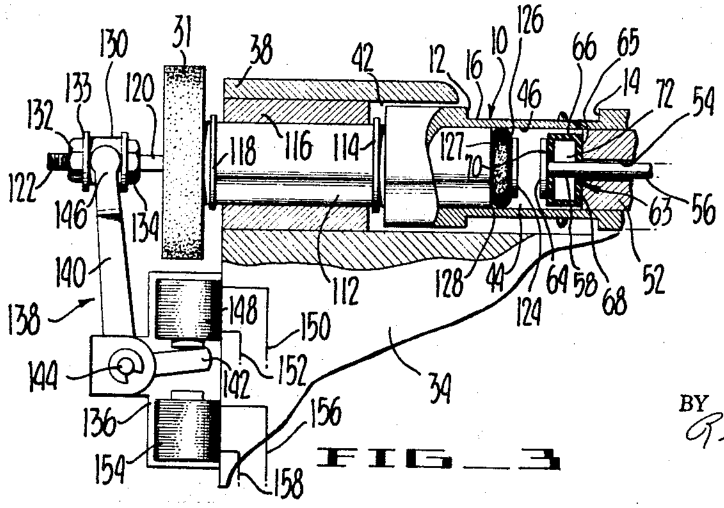
FIG. 3 is a fragmentary view of a portion of the FIG. 1 embodiment illustrating the operation of the present invention.

As illustrated in FIGS. 2 and 3 the capstan 10 is formed with an axially extending bore 44 having a substantially cylindrical inner surface 46. The inner surface 46 should preferably be finished to provide for substantially high frictional engagement with a traction member to be described below.

A coupling means for selectively interconnecting the capstan 10 with the continuously rotatable pulley 26 to selectively rotate the capstan in the counter-clockwise direction (as viewed in FIG. 1) is provided. The coupling means includes a power shaft 52 which is provided therethrough with an internal axially extending central bore 54.

Approximately midway between the ends of the power shaft 52 there is a circumferentially extending radially facing groove (not numbered) into which is fitted a retaining ring 62 for maintaining the capstan 10 in axial position within the frame 34, and for maintaining the shaft 52 in axial position within the side portion 36.

An anti-friction member such as, for example, a roller bearing 74, is disposed about the right-hand end of power shaft 52 and generally in abutting relation or close proximity with the lock ring 62 and suitably secured within the bore 44 as by friction, screws, or other means, as desired. A second lock ring 76 is disposed in a circumferential slot formed in the outer surface of the power shaft 52 closely adjacent to the right-hand end of bearing 74. It can thus be understood that the two lock rings 62 and 76 serve to maintain the power shaft 52 axially in the bore 40 while permitting rotation of the power shaft about its longitudinal axis. Drive pulley 26 is fixed to the outer or right-hand end of the power shaft 52 and is provided with a central bore 80.

A traction member actuating rod 56 is disposed coaxially within the power shaft's bore 54 and has an inner end 58 spaced outwardly from the left-hand end of the bore and a short distance into the capstan's central bore 44, and an outer threaded end 60 which extends through the pulley's bore 80 and is spaced outwardly from the right-hand face of pulley 26.

An axial force transmitting bushing or collar 82, having axially opposite radially extending flanges 83 and 85, is adjustably secured on the outer end 60 of rod 56 by means of adjusting nuts 84 and 86.

A traction member retaining and operating plate 64, secured to the left-hand end of the rod 56, forms with the rod 56 and left-hand wall of power shaft 52 a circumferentially extending groove 72. Within the groove 72 there is an annular capstan engageable traction means or member 63 having an axially extending radially outer wall portion 66 and a pair of radially extending side or leg portions 68 and 70 (see FIG. 3) integral with the wall portion. The traction member 63 is comprised of a relatively flexible or deformable material which has the property of returning to its initial shape after being deformed by externally applied forces, i.e., it is elastic or resilient. Such material may be, for example, natural or artificial rubber. While the traction member 63 is shown in cross-section in the figures as being U-shaped and hollow, the member may be solid in cross-section.

The radially outer circumferential surface of the outer wall portion 66 is finished to provide for efficient frictional engagement with the inner surface 46 of the capstan's bore 44 when operated as described below. The leg portions 68 and 70 are preferably permanently secured to their respective abutting surfaces of the shaft 52 and plate 64. In this manner the traction member 63, the rod 56 and attached plate 64, and the shaft 52 are rotated about the longitudinal axis or center line of the bore 44 as a unit as the pulley 26 is continuously rotated.

A decrease in the axial dimension of the traction member 63 by means of externally applied forces will cause a distortion or flexing of the outer wall portion 66 radially outwardly. Thus the traction member increases its circumferential, or radial dimension until the external surface of the wall portion 66 contacts the inner cylindrical surface 46 of the capstan bore 44. Further decrease in the axial dimension of traction member 63 will further urge the outer surface of axial wall portion 66 into firm frictional engagement with the inner surface 46 of the capstan bore 44.

Since the traction member 63 is being rotated at a constant angular speed as its outer wall portion 66 is placed in firm frictional contact with the capstan's bore surface 46, the capstan will commence to rotate at the same angular speed as the traction member 63. In this manner perforated paper 20 that is in driving relation with the external surface 16 and sprockets 18 of the capstan, as shown in FIG. 1, will be driven at a substantially constant speed in a direction that the top of the capstan's external surface 16 is moved.

An operating arm and solenoid mounting frame 88 is secured to the right side of the base frame 34 at a location generally below the drive pulley 26. An L-shaped operating arm 90, having an upstanding yoke member 92 and a horizontal solenoid operated member 94, is pivotally mounted on a shaft or pin 96 secured to the mounting frame 88. The upper portion of yoke member 92 is provided with a pair of generally spherically shaped tips 98 (only one of which is shown in the figures) which are disposed between the flanges 83 and 85 on diametrically opposite sides of the bushing 82.

A first operating solenoid 100 is suitably secured to the frame 88 just over the solenoid operated member 94. Electrical power for energizing the first solenoid 100 may be selectively applied to the solenoid by means of leads 102 and 104. A second solenoid 106 is mounted on the side of frame 34 just below solenoid operated member 94. Electrical power to actuate the second solenoid 106 may be selectively applied to the solenoid by means of leads 108 and 110.

Application of electrical power to first solenoid 100 will attract the operating member 94 and cause the yoke member 92 to pivot about shaft 96 (clockwise in FIG. 2) thereby slidably moving the operating rod 56 a short distance outwardly (to the right in FIG. 2). Movement of rod 56 outwardly of bore 54 moves plate 64 toward the inner end of shaft 52 thus, in effect, decreasing the axial dimension of groove 72 and imposes an axially directed force to the traction member 63 thereby decreasing the axial dimension of the traction member 63.

Removal of electrical power from the first solenoid 100 causes removal of the axially directed force which decreases the axial dimension of the traction member 63. The natural resiliency of the traction member will cause the member to return to its unstressed condition or shape and, in doing so, will urge the plate 64 away from the end of shaft 52, which will also urge rod 56 and operating arm 90 back to their former positions.

The second solenoid 106 is utilized to provide for more rapid disengagement of the traction member from the internal surface 46 of the capstan 10 than is provided by the natural resiliency of the traction member 63. The second solenoid should be energized at the same instant of time that power is removed from the first solenoid. The power to the second solenoid 106 need be maintained only until the traction member 63 is fully disengaged from the capstan 10, at which time power should be removed from the solenoid 106. When power is then removed from the solenoid 106 (and solenoid 100), the operating arm 90 is free to return to its neutral position, as shown in FIG. 2.

For selective driving of the capstan 10 in a direction opposite, i.e., for backward or reverse drive of a tape instead of forward drive like that provided by the structure heretofore described, there is provided means for selectively coupling rotative power from the pulley 30 (which is continuously rotated in a direction opposite to pulley 26) to the capstan 10. As shown in FIGS. 2 and 3, a shaft 112, which is like shaft 52 described previously, has an inner end extending into the left-hand portion of capstan bore 44 and is provided with an internal axially extending bore (not shown) like bore 54 of right-hand shaft 52. A retaining ring 114 is disposed in a circumferential groove (not shown) on the shaft 112. The left-hand or outer end of shaft 112 is mounted in a bearing 116 which, in turn, is mounted in the left-hand bore 42 of left side portion 38 in the same manner as that shown and described for shaft 52 and bearing 74. Likewise, a second retaining ring 118 is disposed in a circumferential groove (not shown) provided near the left-hand portion of shaft 112 adjacent the outer or left-hand end of bearing 116. The shaft 112 is thus mounted for rotation about its longitudinal axis and secured against axial movement. Retaining ring 114, in cooperation with retaining ring 62, serves to maintain the capstan 10 in axial position within the frame 34.

An operating rod 120, which is like previously described operating rod 56, extends through the central bore of shaft 112 and has a threaded outer end 122 and an inner end extending into the capstan bore 44. A plate 124 is fixed to the right-hand end of rod 120 thereby forming an annular groove (not numbered), like groove 72 described previously, and into which is disposed a second traction means or member 126. While not shown in cross-section, it is to be understood that traction member 126 is, like first traction member 63, formed with an axially extending outer wall 127, and integral side leg portions (not shown) which are secured to the plate 124 and the inner end 128 of the shaft 112. The material of which traction member 126 is comprised is the same as the material comprising first traction member 63, i.e., it has the property of being flexibly resilient. When in its unstressed condition or state, the diametrical dimension of the traction member is just less than the diameter of capstan bore 44. The external peripheral surface of the outer axial wall 127 is finished so as to provide for efficient frictional engagement of the wall 127 with the surface 46 of capstan bore 44 when the traction member 126 is radially and circumferentially expanded upon axial compression thereof in the same manner as described for traction member 63.

As shown in FIG. 3, traction member 126 is compressed axially so as to expand the outer wall 127 into frictional engagement with the inner surface 46 of the capstan bore 44.

The pulley 30, which has a central opening (not shown, but like opening 80 of pulley 26) is attached to the left or outer end of the shaft 112. The threaded end 122 of rod 120 extends through the pulley 30 to a location outwardly therefrom. A yoke follower or collar 130, having a pair of flanges 131 and 133, is positioned over the threaded end 122 of the rod 120 and axially adjustably secured in place by a pair of nuts 132 and 134.

A second operating arm and solenoid mounting frame 136 is secured to the left side of the base frame 34 at a location generally below the drive pulley 30. An L-shaped operating arm 138, having an upstanding yoke member 140 and a horizontal solenoid operated member 142, is pivotally mounted on a shaft or pin 144 secured to the mounting frame 136. The upper portion of yoke member 140 is provided with a pair of generally spherically shaped tips 146 (only one of which is shown in FIGS. 2 and 3) which are disposed between flanges 131 and 133.

A third solenoid 148 is suitably secured to the frame 136 just over the solenoid operated member 142 of arm 138. Electrical power for energizing the solenoid 148 may be selectively applied by means of leads 150 and 152. A fourth solenoid 154 is mounted on the side of frame 136 just below solenoid member 142. Electrical power to actuate the fourth solenoid 154 may be selectively applied by means of leads 156 and 158.

Application of electrical power to solenoid 148 will attract the operating member 142 and cause the yoke member 140 to pivot in the counter-clockwise direction, as shown in FIG. 3, thereby moving the operating rod a short distance outwardly to the left of the central bore of shaft 112, and cause radial and circumferential expansion of traction member 126 in the same manner as that previously described for traction member 63, and thus applying rotative power to the capstan 10 for rapid rotation in a direction opposite to that effected by traction member 63.

Likewise, removal of electrical power from solenoid 148 and application of power to solenoid 154, for a brief period of time, will rapidly disengage traction member 126 from the capstan 10.

It will be understood that only one of the capstan engaging solenoids 100 or 148 may be energized at any one period of time, i.e., one of the solenoids must be in the unenergized condition before energizing the other solenoid.

It will be evident that disengaging solenoids 106 and 154 may be replaced with biasing springs if desired, to provide a force for returning the respective traction members 63 and 124 rapidly to their unstressed state after removal of power from the respective energizing solenoids 100 and 148.

Figure 4:
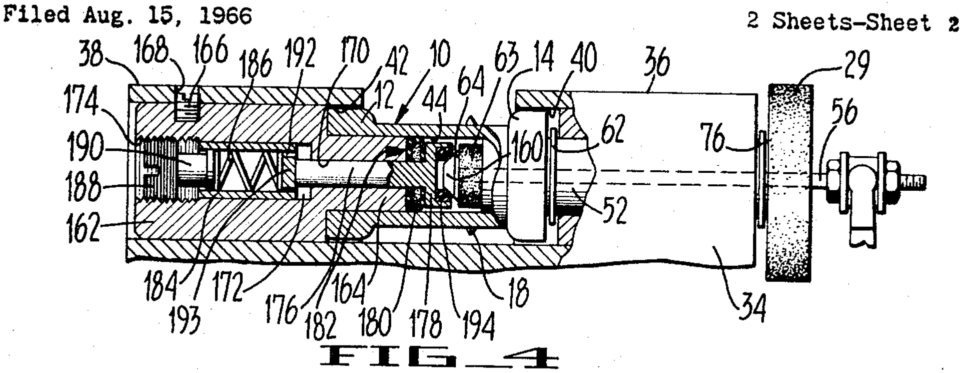
FIG. 4 is a partial cross-sectional end view of a second embodiment of the present invention.
Figure 5:
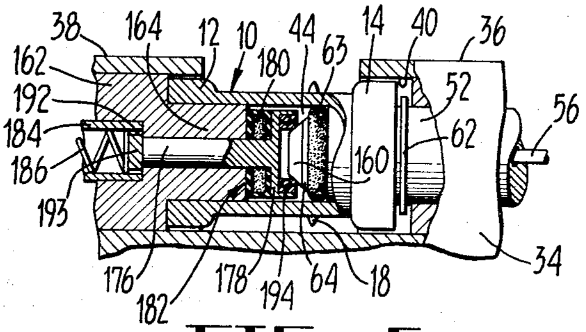
FIG. 5 is a fragmentary view of a portion of the FIG. 4 embodiment illustrating its operation.

A second embodiment of a paper tape handling apparatus incorporating the principles of the present invention is shown in FIGS. 4 and 5. In this second embodiment the capstan 10 may be coupled with a source of rotative power indicated by belt 29 in a manner like that described in connection with FIGS. 1, 2 and 3, and the capstan may be quickly braked or halted by a braking means which also utilizes the principles of the present invention.

As shown in FIGS. 4 and 5, base 34 is provided with upstanding side portions 36 and 38 having axially aligned bores 40 and 42, respectively, as in the FIG. 1 embodiment. Taking plate 64, in FIGS. 4 and 5, as a reference point, the plate and all structure located to the right of the plate are identical to that shown in FIGS. 1, 2 and 3 and individual items bear the same legend numerals. In addition, the construction of the capstan 10 of FIGS. 4 and 5 is identical to the corresponding capstan 10 of FIGS. 1, 2 and 3. It is to be understood that the embodiment of FIGS. 4 and 5 also includes solenoids for operating rod 56, which solenoids and their arrangement may be identical to solenoids 100 and 106 of FIG. 2. Thus, movement of rod 56 to the right, as viewed in FIGS. 4 and 5, comprises or shortens the traction member 63 axially, thereby effecting radial and circumferential expansion of the traction member so as to frictionally engage the inner surface of the capstan bore 44 and cause rotation of the capstan 10 in a direction according to the direction of continuously moving belt 29.

Structure forming the brake means incorporating the principles of the present invention is shown in FIGS. 4 and 5, to the left of the plate 64. A brake actuating member 160, shown in the form of a truncated cone, is secured to the left-facing surface of plate 64 so that the smaller end of the brake actuating member points toward the left end of the capstan 10.

A brake mounting member having a left-hand cylindrical shaped outer end portion 162, with a diameter substantially equal to the diameter of the bore 42, and a righthand cylindrical shaped inner end portion 164, with a diameter substantially equal to the capstan bore 44, is inserted axially into the bore 42 so that the inner end portion 164 is disposed within the capstan bore 44. The outer circumferential surface of the brake mounting member's inner end portion 164 serves as a bearing surface for the left-hand surrounding shoulder portion 12 of capstan 10. If desired, an antifriction means, such as, for example, ball bearings, may be disposed between the inner portion 164 and the capstan 10 in order to reduce rotative friction between the two parts.

The brake mounting member is maintained in an irrotational condition with respect to the axis of rotation of the capstan 10, and in a fixed axial position by means of a set screw 166 threadedly engaged in a threaded opening 168 provided in the side portion 38.

A bore 170 extends through the brake mounting member's inner portion 164 and opens into a counterbore 172 which is formed with internal threads 174 near its left end. A brake actuating rod 176 is slidably disposed in bore 170 and has an inner or right-hand end which extends into the capstan bore 44 and to which is fixed a plate 178; the other or left-hand end of the rod 176 extends a short distance into the counterbore 172 (shown best in FIG. 4).

The plate 178 and right end face of inner portion 164 form an annular groove 180 into which is disposed a brake traction member 182. The brake traction member is like the rotatable traction member 63 in that it is formed of a resiliently flexible material and has an outer axial wall and a pair of radially extending side walls integral with the outer wall. The diametrical dimension of the brake traction member 182, when in the unstressed state as shown in FIG. 5, is slightly less than the internal diameter of the capstan bore 44. The side walls of the traction member 182 are secured to the respective abutting surfaces of the end of inner portion 164 and the plate 178. The rod 176 and plate 178 should preferably be maintained against angular movement about the rod's horizontal axis in order to prevent or overcome angular shearing or twisting of the brake traction member 182 as it is flexed into contact with the rotating capstan, as explained more fully below. To prevent angular movement of the rod 176 and attached plate 178, longitudinal keyways may be formed in the rod and the inner portion facing the rod, and a slug inserted across the keyways. Other well-known means for preventing angular movement of rod 176 while permitting axial movement may be utilized. Thus, the rod 176 and attached plate 178 are irrotational with respect to the axis of capstan 10.

A hollow spring-retaining and rod-operating member or piston 184 is axially slidably disposed in counterbore 172. A compression spring 186 is disposed axially within the hollow portion of the piston 184. A set screw 188 is adjustably threaded into the left threaded portion of counterbore 172 and has a short stub member 190 which extends into the hollow portion of piston 184 and bears against one end of compression spring 186 which, in turn, bears against the right wall 193 of the piston, thereby urging the piston toward the right with a preset force. The opposite side of the piston wall 193 bears against the left-hand end of rod 176, thus urging the plate 178 in a direction away from the right-hand end of inner portion 164, thereby biasing the brake traction member 182 to its unstressed state or configuration, as shown in FIG. 5.

If desired, a series of small openings 192 extending axially through the end wall 193 of the piston 184 will provide for free flow of air between both sides of the wall as the piston moves in either axial direction, thereby preventing pressure buildup that might retard the rapid axial movement of the piston and, of course, the rod 176 during operation.

On the right-hand face of the plate 178 there is mounted an axial thrust bearing 194 which has a central cut-out portion or opening into which the smaller end of truncated cone-shaped brake actuating member 160 is disposed. In this manner the continuously rotating actuating member 160 may be moved axially to the left and cause the nonrotatable plate 178 to be moved toward the left, thereby flexing the brake traction member 182 into frictional engagement with the surface of capstan bore 44, as shown in FIG. 4. Since the brake traction member 182 is a source of nonrotative mechanical power, the rotating capstan is rapidly brought to a halt.

Movement of the truncated cone actuating member 160 back to its former position, wherein brake traction member 182 is restored to its nonflexed state and rotating traction member 63 is flexed to engage the surface of capstan bore 44, is aided by the force of spring 186 acting in the rightward direction.

Figure 6:
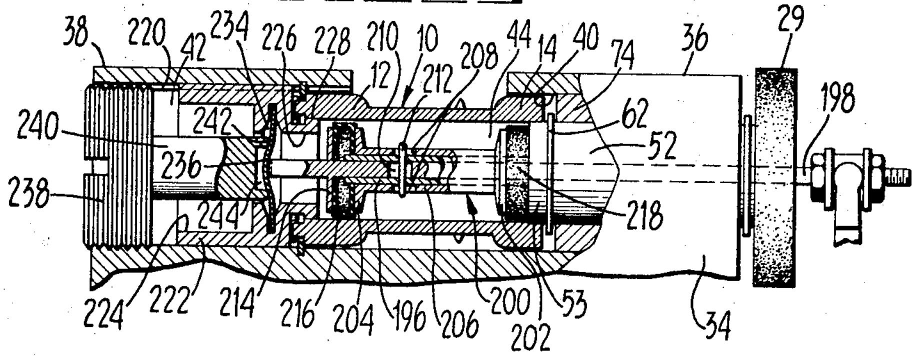
FIG. 6 is a partial cross-sectional end view illustrating a third embodiment of the present invention.
Figure 7:
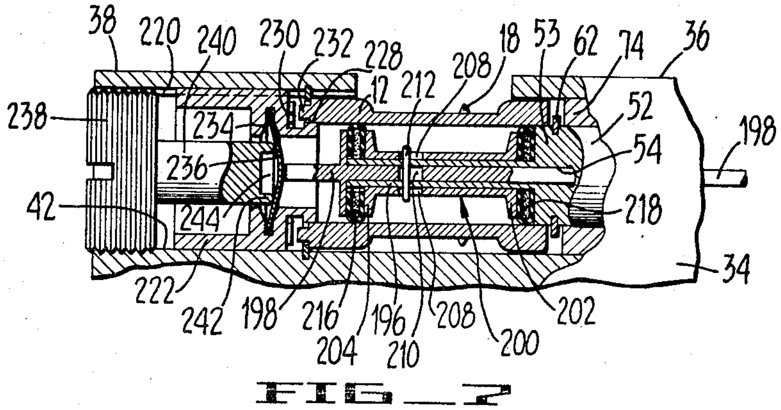
FIG. 7 is a fragmentary view of the embodiment shown in FIG. 6 showing its operation.

A third embodiment of the present invention, as illustrated in FIGS. 6 and 7, is particularly adapted for very precise indexing or stepping of a paper tape drive capstan 10. As with the other two previously described embodiments, the third embodiment includes a base frame 34 having upstanding spaced apart side portions 36 and 38 with axially aligned bores 40 and 42, respectively. The capstan 10 has a cylindrical bore 44 extending axially therethrough. Shaft 52 is journalled in a bearing 74 which is secured in bore 40. A first shoulder portion 53 of the shaft 52 extends but a short distance into the capstan bore 44 and serves as a support for the right-hand end of the capstan. A tubular extension 196 (best seen in FIG. 7) of shaft 56 extends axially from the shoulder portion 53 to a location within the capstan bore 44 that is surrounded by the capstan's left shoulder 12. Shaft 52 is provided therethrough with a central bore 54 which is coextensive with the internal bore of tubular extension 196.

An operating rod 198, similar in function and structure to operating rod 56 of the previously described embodiments, is axially slidably disposed within the coextensive bores of tubular extension 196 and shaft 52. The right-hand portion of rod 198 extends outwardly through the shaft 52 and attached driving pulley and terminates in a threaded end to which a collar is secured, and an operating yoke member is engaged as in the previously described embodiments. The left-hand portion of rod 198 extends outwardly to the left of the left end of tubular extension 196.

While not shown in FIGS. 6 and 7 it is to be understood that a pair of operating solenoids, like solenoids 100 and 106 of FIG. 2, are provided to operate the yoke for moving rod 198 axially during operation of the complete apparatus.

A spool-shaped spacing and force transmitting member 200, having a pair of radially outwardly extending flanges 202 and 204 integral with a central barrel portion 206, is axially slidably disposed on the tubular extension 196. The barrel portion 206 has formed therein a pair of diametrically opposed slots 208. The rod 198 has formed therethrough a diametrically extending opening 210 which is in line radially and axially with the pair of slots 208 of the spacing member's barrel portion 206. Those portions of tubular extension 196 sandwiched between each slot 208 and opening 210 are provided with a pair of diametrically opposed pin-receiving holes (not numbered). A rotative force transmitting pin 212 extends through the aligned slots 208, opening 210, and pair of holes in the tubular extension 196. The pin may be retained in position by frictional engagement with the sides of the holes in the tubular extension, or other well-known means, such as snap rings, may be used.

It can thus be understood that rotation of the shaft 52 and integral tubular extension 196 effects positive or direct drive rotation of rod 198 and spacing member 200, while at the same time permitting axial movement of the spacing member and rod with respect to the tubular extension during operation.

Near the left portion of the rod 198 there is formed, integrally with the rod, a radially extending plate 214 spaced axially to the left of spacing member flange 204. It should be clear that the plate 214 is movable toward and away from the flange 204 as rod 198 moves to the right and to the left during operation.

An annular traction member 216 is disposed in the space between the plate 214 and flange 204. The traction member 216 is, like traction member 63 of the FIGS. 2 and 3 embodiment, formed of a resilient flexible material and has an outer wall and radially inwardly extending side walls integral with the outer wall. The side walls are secured to the immediately adjacent plate 214 and flange 204. The diametrical dimension of the traction member 216, when in the unstressed state or condition as shown in FIG. 6, is slightly less than the diameter of the capstan bore 44. Axial squeezing of the traction member 216 will cause the member to expand radially and thus cause its outer wall portion to be urged into frictional engagement with the inner surface of the capstan bore 44, as shown in FIG. 7.

Another annular-shaped traction member 218 is disposed in the space defined between right-hand spacing member flange 202 and the left-end of shaft 52. In form and composition right-hand traction member 218 is a duplicate of left-hand traction member 216 and has an outer wall and a pair of side walls which are secured to the abutting flange 202 and left end of shaft 52 respectively. Thus it can be understood that axial squeezing of the right-hand traction member 218 will result in diametrical expansion thereof and will effect frictional engagement of its outer wall with the inner surface of the capstan bore 44, as shown in FIG. 7.

Movement of the rod 198 to the right presses plate 214 axially against the left-hand traction member 216 which, in turn, presses against the left-hand spacing member flange 204, thus effecting movement of the spacing member 200 to the right so as to cause its right-hand flange 202 to press the right-hand traction member 218 against the axially stable left end of shaft 52. Further continued movement of rod 198 to the right will effect squeezing of the two traction members 216 and 218 simultaneously, thereby effecting diametrical expansion thereof to engage the inner surface of the capstan bore 44. Thus the continuously rotated traction members 216 and 218 will impart rotation to the capstan 10.

When the rightward acting force imposed by plate 214 is released, the resiliency of the traction members 216 and 218 will cause them to return to their normal or unstressed state and become disengaged from the inner surface of the capstan bore 44. Release of the traction member distorting force is accomplished by applying a positive leftward directed force to rod 198 by means of the appropriate operating solenoid, as in the FIGS. 2 and 3 embodiment.

An additional feature is incorporated in the FIGS. 6 and 7 embodiment whereby the capstan 10 may be positively and quickly halted in a very precise angular orientation about its axis after the traction members 216 and 218 are disengaged from the surface of the capstan bore 44. As shown by dotted lines in FIGS. 6 and 7, a series of axially extending splines 220 are formed on the inner surface of the frame's left bore 42; the splines extend axially across about the middle one-third of the bore's inner surface. A capstan engaging and indexing member 222, which is generally circular in transverse section, is formed with a plurality of circumferentially spaced axially extending grooves on its outer periphery. The capstan engaging member is inserted axially into the bore 42 so that the splines 220 enter into mating grooves on the engaging member. Thus, the engaging member 222 is slidable axially within the bore 42 but is held against rotation about the bore's axis.

A large bore 224 is formed in the left portion of energizing member 222 for the purpose of reducing to a minimum the member's inertia. A second bore 226 is provided in the engaging member which extends from the large bore 224 to the right end of the engaging member. The right end of the engaging member is formed with a circumferentially extending portion which has a radially outwardly facing capstan bearing surface 228 and an axially facing portion on which a series of teeth 230 (best shown in FIG. 7), facing axially toward the capstan 10, are formed. The left-hand end of the capstan's shoulder portion 12 is formed with a set of teeth 232 facing toward the previously mentioned set of teeth 230. When the member 222 is axially moved toward the right, the teeth 230 and 232 engage or intermesh with each other, and since member 222 is held against rotation by splines 220, the rotating capstan 10 is positively and quickly brought to a halt. The intermeshed teeth 230 and 232 maintain capstan 10 in a precise angular orientation about its axis. The capstan 10 cannot be rotated again until such time that teeth 230 are disengaged from teeth 232 and the traction members 216 and 218 are engaged with the surface of capstan bore 44.

In order to provide for very rapid engagement and disengagement of teeth 230 with teeth 232, an annular spring retaining groove 234 is formed in the engaging member 222 so as to open radially inwardly of bore 226. The left portion of rod 198 extends into the bore 226 and ends at about the same axial location as groove 234. The outer edge of a generally circular dished-like spring member 236 is contained within the annular groove 234 so that the spring member is maintained in a position generally transverse of the axis of the bore 226.

An adjusting screw 238 is adjustably threaded into the left end of bore 42 and is provided with an axially extending spring-biasing rod 240 which extends into the bore 226. The right-hand end of the rod 240 is formed with an axially extending rim 242 which forms a cup-like depression 244 opening axially toward the center of spring member 236. The screw 238 is axially adjusted so that the rim 242 just touches the concave side (left side) of the spring member 236 when the spring member is in its unstressed or normal state, as illustrated in FIG. 7. It is to be noted that when the spring member 236 is in its unstressed or normal state, the rod 198 is in its extreme right-hand position (causing traction members 216 and 218 to be engaged with the capstan 10) and the left end of rod 198 just touches or may be spaced a very slight distance from the center of the convex side (right-hand side) of the spring member 236. In this unstressed state the outer peripheral edge of the spring member axially maintains the capstan engaging member 222 in its extreme leftward position wherein the member's teeth 230 are not intermeshed with the capstan's indexing teeth 232. Thus the capstan 10 is free to be rotated by the rotating traction members 216 and 218.

Movement of the operating rod 198 to the left, as illustrated in FIG. 6, applies a leftward force to the center of the spring member 236. Leftward movement of the spring member, as a unit, is resisted by the rim 242. However, since there is a space or depression 244 adjacent the left-hand central portion of spring member 236, the continued leftward movement of rod 198 pushes the central portion of the spring member into the depression 244. The rim acts like a fulcrum member, thereby causing that portion of the spring member radially outward of the rim to be flexed or pivoted toward the right.

Movement of the outer peripheral edge of the spring member 236 toward the right urges the capstan engaging member 222 toward the right and causes the member's teeth 230 to intermesh with the teeth 232 of the capstan; since teeth 230 are rotationally stationary, the rotating capstan 10 is very rapidly halted and is held securely in such halted position. It should, of course, be evident that the movement of rod 198 to the left, as heretofore described for actuating spring member 236, will also effect removal of frictional contact between traction members 216 and 218 and the capstan 10.

Movement of the rod 198 to the right, subsequent to being moved to the left, will permit the resiliency forces of the spring member 236 to return it to its normal unstressed state and, in doing so, move capstan engaging member 222 to the left and disengage teeth 230 from teeth 232. Thus, the capstan is free to be rotated about its axis when traction members 216 and 218 once again frictionally engage the inner surface of capstan bore 44, which operation takes place as rod 198 is moved toward the right, as described previously.

While the principles of the invention have been made clear in the illustrative embodiments, there will be obvious to those skilled in the art, many modifications in structure, arrangement, proportions, the elements, materials, and components, used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. In combination:

a first member mounted for rotation about an axis,
said first member having a substantially cylindrical bore defining surface whose axis of curvature is coincident with said axis of rotation;
motion affecting means for affecting rotational movement of said first member; and
means for releasably coupling said motion affecting means with said first member, said coupling means comprising:

a second member secured to said motion affecting means and disposed within said bore, said second member having means defining a radially outwardly opening annular groove whose center is located on said axis;

means for selectively increasing and decreasing the axial dimension of said groove; and a resiliently flexible annular traction means disposed in said groove for releasable frictional engagement with said surface, said traction means having a normal unflexed shape wherein its axial dimension is substantially equal to the maximum axial dimension of said groove and its diameter is less than the diameter of said bore, said traction means increasing its diameter in response to a decrease in the axial dimension of said groove to engage said surface, said traction means being irrotational with respect to said second member.

2. In the combination according to claim 1 wherein said motion affecting means is irrotational with respect to said axis.

3. In the combination according to claim 1 wherein said motion affecting means is rotational with respect to said axis.

4. In a combination according to claim 3 wherein there is further included:

brake means disposed at one axial end of said first member, said brake means being provided with an array of teeth facing toward said first member, said first member being provided with an array of teeth facing toward said brake means, said arrays of teeth being enmeshable with each other, said brake means being irrotational with respect to said axis and axially slidable between a first position wherein said arrays of teeth are out of mesh with each other, and a second position wherein said arrays of teeth are enmeshed with each other, means releasably biasing said brake means toward said first position; and means for moving said brake means from said first position to said second position as the axial dimension of said groove is increased.

5. In combination:

a first member mounted for rotation about an axis, said member having a substantially cylindrical bore defining surface whose axis of curvature is coincident with said axis of rotation;

a motion affecting means irrotational with respect to said axis;

a motion affecting means rotational with respect to said axis;

means for releasably coupling said first member with said irrotational motion affecting means and said rotational motion affecting means, said coupling means comprising:

a second member secured to said rotational motion affecting means and disposed within said bore, a third member secured to said irrotational motion affecting means and disposed within said bore;

said second member and said third member each having means defining a radially opening annular groove whose center is located on said axis;

means for increasing and decreasing the axial dimension of said grooves;

each of said grooves having disposed therein resiliently flexible annular traction means for releasable frictional engagement with said surface;

each traction means having a normal unflexed shape wherein its axial dimension is substantially equal to the maximum axial dimension of its associated groove and its diameter is less than the diameter of said bore, each traction means increasing its diameter in response to a decrease in the axial dimension of its associated groove to engage said surface;

each traction means being irrotational with respect to its associated second and third member;

means normally biasing each of said groove defining means so that the traction means associated with said second member is in contact with said surface and the traction means associated with said third member is in its normal unflexed state; and means for releasably causing the groove defining means associated with said second member to increase the axial dimension of its groove to effect resilient return of the associated traction means to its normal unflexed state while simultaneously causing the groove defining means associated with said third member to decrease the axial dimension of its groove to effect engagement of the associated traction means with said surface.

6. A paper web handling apparatus comprising:

frame means having a pair of spaced apart portions, each of said portions having formed therethrough a bore, said bores being in axial alignment with each other, a capstan having opposite end portions, a web engaging central portion, and a substantially cylindrical axially extending bore, each one of said end portions being disposed in different ones of said bores of said frame portions, said central portion being disposed in the space between said spaced portions of said frame means, the axis of said capstan bore being substantially coaxial with the axes of said bores of said frame portions;

at least one of said frame end portion bores having disposed therein a shaft mounted for rotation about the axes of said capstan and end portion bores, one axial end of said shaft extending into said capstan bore and the other axial end of said shaft extending outwardly of said one frame end portion bore;

said shaft having a centrally located axially extending bore therethrough;

means secured to said opposite end of said shaft for continuously rotating said shaft about its axis;

an operating member axially movably disposed within said shaft bore and having one axial end extending outwardly of said one end of said shaft and within said capstan bore, said one axial end of said operating member having a radially extending plate fixed thereto and spaced axially from said one end of said shaft, the other axial end of said operating member extending axially outwardly of said other end of said shaft and through said continuously rotating means;

means secured to the outer end of said operating member for selectively axially moving said operating member between a first position wherein said plate is spaced axially a first distance from said one end of said shaft, and a second position wherein said plate is spaced axially a second distance from said one end of said shaft;

an annular resiliently flexible traction means disposed between said plate and said one end of said shaft, said traction member having a normal nonflexed shape wherein its diameter is less than the diameter of the bore of said capstan, and its axial dimension is equal to said first space between said plate and said one end of said shaft, said traction member increasing its diameter in response to a decrease in the axial space between said plate and said one end of said shaft.

7. A paper web handling apparatus comprising:
frame means having a pair of spaced apart portions, each of said portions having formed therethrough a bore, said bores being in axial alignment with each other;
a capstan having opposite end portions, a web engaging central portion, and a substantially cylindrical axially extending bore, each one of said end portions being disposed in different ones of said bores of said frame portions, said central portion being disposed between said spaced portions of said frame means, the axis of said capstan bore being substantially coaxial with the axes of said bores of said frame portions;
at least one of said frame end portion bores having axially disposed therein a shaft, one axial end of said shaft extending into said capstan bore;
said shaft having a centrally located axially extending bore therethrough;
an operating member axially movably disposed within said shaft bore and having one axial end extending outwardly of said one end of said shaft and within said capstan bore, said one axial end of said operating member having a radially extending plate fixed thereto and spaced axially from said one end of said shaft, the other axial end of said operating member extending axially outwardly of the other end of said shaft;
means connected with said operating member for selectively axially moving said operating member between a first position wherein said plate is spaced axially a first distance from said one end of said shaft, and a second position wherein said plate is spaced axially a second distance from said one end of said shaft;
an annular resiliently flexible traction means disposed between said plate and said one end of said shaft, said traction member having a normal nonflexed shape wherein its diameter is less than the diameter of the bore of said capstan, and its axial dimension is equal to said first space between said plate and said one end of said shaft, said traction member increasing its diameter in response to a decrease in the axial space between said plate and said one end of said shaft.

8. A paper web handling apparatus according to claim 7 wherein said shaft is secured against rotation about said axis.

9. In combination:
a first member mounted for rotation about an axis,
said first member having a substantially cylindrical bore defining surface whose axis of curvature is coincident with said axis of rotation;
a second member disposed within said bore,
said second member having means defining a radially outwardly opening annular groove whose center is located on said axis;
means for selectively increasing and decreasing the axial dimension of said groove as said members rotate; and
a resiliently flexible annular traction means disposed in said groove for releasable frictional engagement with said surface,
said traction means having a normal unflexed shape wherein its axial dimension is substantially equal to the maximum axial dimension of said groove and its diameter is less than the diameter of said bore,
said traction means increasing its diameter in response to a decrease in the axial dimension of said groove to engage said surface,
said traction means being irrotational with respect to said second member.

10. In the combination according to claim 9 wherein there is further included a continuously energizable rotative power means coupled with said second member for continuously rotating said second member.

References Cited

UNITED STATES PATENTS

| | | | |
|---|---|---|---|
| 2,613,468 | 10/1952 | Hand | 192—76 XR |
| 2,284,193 | 5/1942 | Freer | 192—76 XR |
| 2,349,494 | 5/1944 | Fawick. | |
| 2,438,216 | 3/1948 | Jessen. | |
| 2,487,280 | 11/1949 | Starkey. | |
| 2,627,725 | 2/1953 | Cochrane et al. | |
| 2,941,414 | 6/1960 | Lee. | |
| 2,972,263 | 2/1961 | Hines. | |

FOREIGN PATENTS

| | | |
|---|---|---|
| 372,406 | 5/1932 | Great Britain. |

BENJAMIN W. WYCHE III, *Primary Examiner.*